March 18, 1958    R. D. HANCOCK    2,827,232
QUANTIZER
Filed Aug. 27, 1954

INVENTOR:
Robert D. Hancock
By Herbert E. Metcalf
His Patent Attorney

United States Patent Office 2,827,232
Patented Mar. 18, 1958

2,827,232

QUANTIZER

Robert D. Hancock, Compton, Calif., assignor to Northrop Aircraft, Inc., Hawthorne, Calif., a corporation of California Application August 27, 1954, Serial No. 452,694

7 Claims. (Cl. 235—61)

This invention relates to electron-tube bridge circuits to which D. C. input voltages are applied, and more particularly relates to an electronic circuit providing means of measuring discretely the magnitude of a low input direct current signal voltage.

An object of this invention is to provide means for obtaining a number of discrete pulses which are proportional in number to the magnitude of a given D. C. input voltage.

It is a further object of this invention to provide a means for digitally counting by employing a counter to discretely count the number of pulses required to charge a condenser to a balancing condition.

Basically, the invention consists of a voltage differential sensing device such as a bridge circuit, including two substantially identical electron-tubes for example. A D. C. input voltage is applied to the grid of one of these electron-tubes. By virtue of this applied D. C. input voltage, the bridge balance is upset and a voltage output is connected to a gating device which directs the positive pulse output of a pulse generator to a control circuit which serves to transmit incremental quantities of positive charge or of negative charge to a condenser. It is the charge on this condenser which equalizes the grid bias of one of the electron-tubes with the grid bias of the other electron-tube and consequently restores the balance condition of the bridge. Essentially, this condenser serves as an integrating device.

The utility of bridge circuits as electronic measuring devices has long been recognized. By balancing the bridge or obtaining equivalent circuit conditions in each branch, unknown circuit values in one branch may be obtained by comparison with the known values in another branch.

A proposed use of this invention is the conversion of analogue information into digital form such as might be employed in telemetering or in varied computer embodiments.

Figure 1:
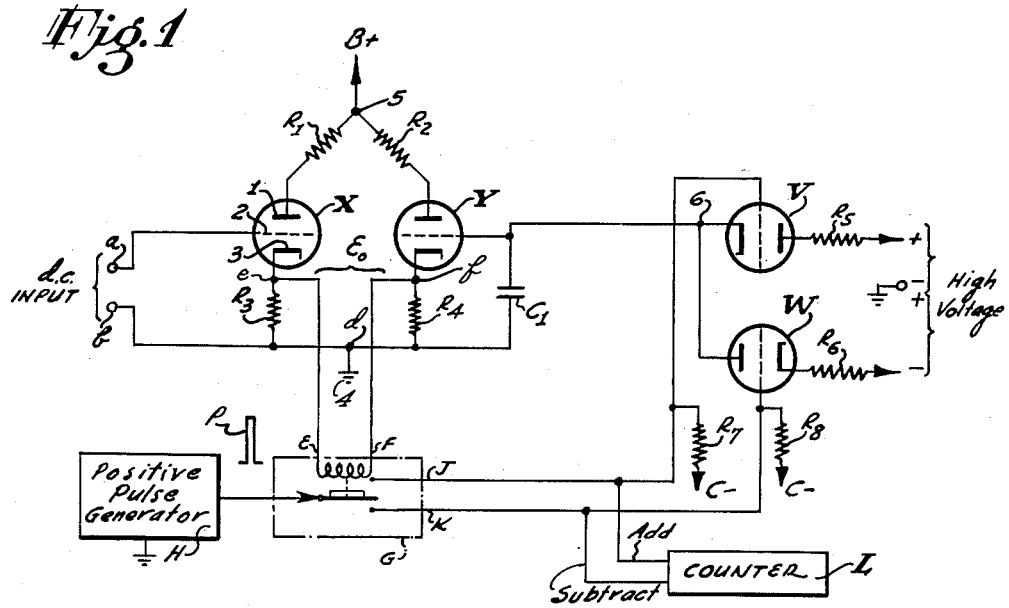
Figure 1 is a circuit diagram of one preferred form of the invention.

Referring first to Figure 1, there is shown a bridge circuit comprised of a resistor $R_1$, in series with triode X having a plate 1, grid 2, and cathode 3, a resistor $R_2$ in series with triode Y, and equal valued cathode resistances $R_3$ and $R_4$ of triodes X and Y, respectively connected to ground 4. Resistance $R_1$ is equal in value to the resistance of $R_2$. The two triodes X and Y are of the same type and have substantially the same characteristics. Adequate plate voltage (B+) is applied between points 5 and $d$ (ground). Any upset in the normally balanced potentials at points $e$ and $f$ produces a bridge output voltage $E_0$ which is routed from across points $e$ and $f$ by means of leads E and F to the control terminals of a selective gating device G.

It is the purpose of gate G to properly route the output pulses P of positive pulse generator H to either lead J or to lead K which are connected to the grids of triodes V and W, respectively. These gate tubes, V and W, are grid controlled triodes which are biased to cut-off. The plate of tube W and the cathode of tube V are both connected to the grid of tube Y. A condenser $C_1$ connects the grid of tube Y to ground 4. A high positive voltage is applied to the plate of tube V through resistor $R_5$ and a high negative voltage is applied to the cathode of tube W, through resistor $R_6$. The C— bias is applied to the grids of tubes V and W via resistors $R_7$ and $R_8$, respectively.

Selective gating device G is preferably a polarized relay having a center balanced armature and positive and negative armature contacts. The relay coil, in this instance, is connected directly in series from lead E to lead F. The armature is connected to the output of pulse source H and the positive armature contact is connected to lead J, the negative armature contact being connected to lead K. When lead E is positive relative to lead F, the armature is deflected to the positive armature contact whereas when lead E is negative relative to lead F, the armature is deflected against the negative armature contact. Thus, the output pulses of source H are correctly directed to either lead J or lead K.

The triodes X and Y are wired such that plate current flows in them at all times (i. e. class A operation). Consequently these tubes X and Y act efficiently as variable resistances with values dependent upon their grid bias. The application of a small, unknown D. C. signal to input terminals $a$ and $b$ applies grid bias to tube X and consequently the bridge circuit is unbalanced and an output voltage $E_0$ occurs across leads E and F.

When the resulting current flow in lead E is positive and the current in lead F is negative with respect to lead E, the gate G will gate the positive pulse output P from the generator H into line J, thereby permitting tube V to conduct during the course of each pulse until the condenser $C_1$, and consequently the grid of tube Y, is charged to the same potential as that of the unknown voltage applied to the grid of tube X.

The condenser $C_1$ is preferably a non-stressed polystyrene film dielectric type with extremely low loss, the leakage being negligible to the extent that it is possible to put on a charge of one coulomb and to then extract one coulomb from the condenser without detectable loss.

Figure 2:
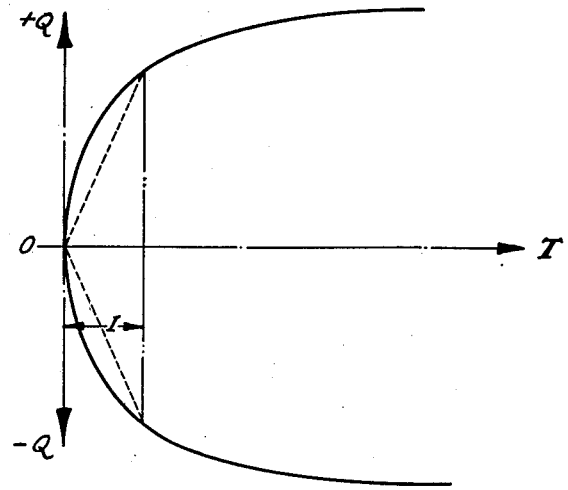
Figure 2 is a graph illustrating a plot of charge "Q" versus time "T," such as takes place in condenser $C_1$ in the circuit of Figure 1.

Figure 2 comprises a plot of charge Q versus time T for the condenser $C_1$ in the circuit of Figure 1. The time constant of the circuit which charges the grid of tube Y is dependent upon the values of resistances $R_5$ and $R_6$ and also upon the capacity of condenser $C_1$. Operation upon the lower part of the curve where it is relatively linear, as the dotted line in Figure 2 indicates, is desirable because this permits the measurement of relatively low unknown D. C. input voltages by means of the suitable positive pulses generated. Just how quickly the condenser $C_1$ can be charged to the value required for bridge balance is dependent upon the rate, width, and amplitude of the positive pulses P. Because the maximum time interval of reasonable linearity I of the condenser charge is a function of the time constant as is shown in Figure 2, pulses P of sufficiently narrow width, sufficiently high amplitude, and sufficiently fast rate must be provided to digitally measure the unknown voltages.

Figure 3:
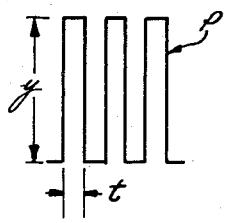
Figure 3 is a graph of a rectangular waveform, or a series of positive pulses, such as might be used to convey charge to the condenser $C_1$ so as to restore bridge balance in the circuit of Figure 1.

Typical rectangular pulses P of sufficiently narrow width $t$ and sufficiently high amplitude $y$ are shown in Figure 3. However, the pulse shape need not necessarily be rectangular. Moreover, pulses shaped as triangular or narrow sine wave peaks, or of any shape suitable to convey approximately equal increments of charge to the condenser, would suffice.

Referring again to Figure 1, and considering the case when the unknown D. C. voltage input is such as to render lead F to be at a higher potential than lead E, note that, in this case, the action of the gate G will be to route the generated positive pulses P into lead K, thereby causing the tube W to conduct during the duration of each pulse. The connection 6 of tube W is such that the condenser $C_1$ will receive negative charges during each momentary conduction of tube W and will consequently be lowered in potential. Hence, tube W will conduct and convey momentary negative charges to condenser $C_1$ until it is properly charged so that the grids of triodes X and Y are at the same potential.

Depending upon the polarity incurred to leads E and F by virtue of the unknown D. C. input voltage applied at points $a$ and $b$, the gate G serves to send pulses to either tube W to cause condenser $C_1$ to lose potential or to tube V to cause condenser $C_1$ to gain potential. Tubes W or V will conduit in digital fashion until the charge on condenser $C_1$ is such that the grids of tubes X and Y are at the same potential. Consequently, separate counters may be connected to leads J and K and the difference taken, or a differential counter may be connected thereto in order to count discretely the number of pulses required to charge condenser $C_1$ properly.

As shown in Figure 1, an add-subtract counter L, for example, is wired across gate output leads J and K in order to provide means of indicating the number of pulses P required to charge condenser $C_1$ sufficiently so as to equalize the grid potentials of electron-tubes X and Y. This then provides a measure of the magnitude of the D. C. input signal. Of course, other types of pulse actuated devices can be connected to leads J and K for different purposes.

While in order to comply with the statute, the invention has been described in language more or less specific as to structural features, it is to be understood that the invention is not limited to the specific features shown, but that the means and construction herein disclosed comprise a preferred form of putting the invention into effect. For example, the selective gating device G can be electronic gating means which would, however, require a larger number of elements. Similarly, tubes W and V can be easily replaced by two ordinary relays, in which case resistors $R_7$ and $R_8$ including the C— bias can be deleted. The coil of one relay can be connected to lead J and the coil of the other relay can be connected to lead K. The other coil ends are, of course, grounded. The armature of the former is connected to resistor $R_5$ and the armature of the latter is connected to resistor $R_6$. The armature contacts of each relay are both connected to point 6. The relays can thus perform the same function as do the tubes W and V. Furthermore, while the two bridge tubes X and Y have been illustrated as triodes in Figure 2, it should be understood that any other suitable electron-tube can also be used for this purpose. The invention is, therefore, claimed in any of its forms or modifications within the legitimate and valid scope of the appended claims.

What is claimed is:

1. A quantizing circuit comprising a bridge circuit including a first and a second electron tube having substantially identical characteristics, each of said electron tubes having at least a cathode, a control grid and an anode, a first resistor connected to the anode of said first electron tube, a second resistor connected to the anode of said second electron tube, a third resistor connected to the cathode of said first electron tube and a fourth resistor connected to the cathode of said second electron tube, a first source of D. C. voltage, the free ends of said first and second resistors being connected to the positive terminal and the free ends of said third and fourth resistors being connected to the negative terminal of said first source, two input terminals adapted to be connected to a D. C. input signal, one of said input terminals connected to the control grid of said first electron tube and the other input terminal connected to the negative terminal of said first source, a condenser connecting the control grid of said second electron tube to the negative terminal of said first source, a pulse generator having a reference potential side grounded to the negative terminal of said first source, selective gating means for gating the pulse output from said generator into a first line or a second line, means connecting the cathode of said first tube and the cathode of said second tube to said selective gating means for control thereof, said selective gating means passing said pulse output into said first line when the cathode potential of said first electron tube is positive relative to the potential of the cathode of said second electron tube and passing said pulse output into said second line when the cathode potential of said first electron tube is negative relative to the potential of the cathode of said second electron tube, a positive and a negative high voltage source, the negative end of said positive high voltage source and the positive end of said negative high voltage source being connected together and to the negative terminal of said first D. C. voltage source, a fifth resistor having one end connected to the positive end of said positive high voltage source, a sixth resistor having one end connected to the negative end of said negative high voltage source, and pulse responsive means connected to said first and second lines for connecting the other end of said fifth resistor to the control grid of said second electron tube when said first line conducts said pulse output and connecting the other end of said sixth resistor to the control grid of said second electron tube when said second line conducts said pulse output whereby the charge on said condenser connected to the control grid of said second electron tube is respectively increased or decreased until the potential of the control grid of said second electron tube is equal in magnitude to said D. C. input signal applied to the control grid of said first electron tube.

2. Apparatus in accordance with claim 1 including, in addition, counter means connected to said first and second lines for indicating the number of pulses from said generator required to adequately charge said condenser thereby providing a numerical measurement of the magnitude of a D. C. input signal connected across said input terminals.

3. Apparatus in accordance with claim 1 wherein said selective gating means includes a polarized relay having a center balanced armature and first and second armature contacts, said armature connected to the output of said pulse generator, said first armature contact being connected to said first line and said second armature contact being connected to said second line respectively.

4. Apparatus in accordance with claim 1 wherein said pulse responsive means includes a first and second triode, said first and second lines connecting with the control grids thereof, said other end of said fifth resistor connected to the plate of said first triode and said other end of said sixth resistor connected to the cathode of said second triode, the cathode of said first triode and the plate of said second triode connected to the control grid of said second electron tube to charge said condenser connected thereto.

5. A quantizing circuit comprising a bridge circuit including a first and a second electron tube having substantially identical characteristics, each of said electron tubes having at least a cathode, a control grid and an anode, a first resistor connected to the anode of said first electron tube, a second resistor connected to the anode of said second electron tube, a third resistor connected to the cathode of said first electron tube and a fourth resistor connected to the cathode of said second electron tube, a first source of D. C. voltage, the free ends of said first and second resistors connected to the positive terminal and the free ends of said third and fourth resistors connected to the negative terminal of said first source, two input terminals adapted to be connected to a D. C. input signal, one of said input terminals connected to the control grid of said first electron tube and the other input terminal connected to the negative terminal of said first source, a condenser connecting the control grid of said second electron tube to the negative terminal of said first source, a positive pulse generator having a reference potential side grounded to the negative terminal of said first source, a polarized relay having a control coil, a center balanced armature and first and second armature contacts, said coil connecting the cathodes of said first and second electron tubes and said armature being connected to said positive pulse generator, a first line and a second line connected respectively to said first and second armature contacts whereby the positive pulses of said generator are directed to said first line when said armature is deflected against said first contact and to said second line when said armature is deflected against said second contact, a positive and a negative high voltage source, the negative end of said positive high voltage source and the positive end of said negative high voltage source being connected together and to the negative terminal of said first D. C. voltage source, a first and a second triode, the control grid of said first triode connected to said first line and the control grid of said second triode connected to said second line, a fifth resistor connecting the positive end of said positive high voltage source to the anode of said first triode, and a sixth resistor connecting the negative end of said negative high voltage source to the cathode of said second triode, the cathode of said first triode and the anode of said second triode being connected to the control grid of said second electron tube to charge said condenser connected thereto.

6. Apparatus in accordance with claim 5 including, in addition, counter means connected to said first and second lines for providing a numerical measurement of a D. C. input signal connected across said input terminals.

7. Apparatus in accordance with claim 5 including means for biasing the grids of said first and second triodes negatively.

References Cited in the file of this patent
UNITED STATES PATENTS
2,543,491   Froman _____ Feb. 27, 1951